(12) United States Patent
Sogawa et al.

(10) Patent No.: US 7,206,273 B2
(45) Date of Patent: Apr. 17, 2007

(54) OPTICAL PICKUP

(75) Inventors: Teruaki Sogawa, Osaka (JP); Takayuki Murakami, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 512 days.

(21) Appl. No.: 10/868,039

(22) Filed: Jun. 16, 2004

(65) Prior Publication Data

US 2004/0257927 A1    Dec. 23, 2004

(30) Foreign Application Priority Data

Jun. 17, 2003    (JP)    ............................ P2003-172112

(51) Int. Cl.
*G11B 7/00*    (2006.01)
(52) U.S. Cl. ..................................... 369/100
(58) Field of Classification Search ..................... None
See application file for complete search history.

(56) References Cited

U.S. PATENT DOCUMENTS 4,647,155 A * 3/1987 Bjorklund et al. .......... 362/259

6,700,860 B2 * 3/2004 Ito et al. ..................... 369/253

FOREIGN PATENT DOCUMENTS

JP    2-220228    9/1990

\* cited by examiner

*Primary Examiner*—Paul W. Huber
(74) *Attorney, Agent, or Firm*—Morgan, Lewis & Bockius LLP

(57) ABSTRACT

An optical pickup has a base having a screw hole, a holder attached to the base, a laser diode held by the holder, a leaf spring, and an adjusting screw. The holder is formed of a substantially rectangular metal plate having short and long sides and is formed with a laser hole for fitting the laser diode through a center thereof. An angular fulcrum is formed at the center of a back surface of the holder along a direction parallel to the short side. The fulcrum is brought into abutment with the base via the leaf spring and one end of the holder is urged toward the base by the leaf spring. The holder is temporarily secured to the base by screwing the adjusting screw through an insertion hole formed at the other end of the holder into the screw hole of the base.

7 Claims, 7 Drawing Sheets

OPTICAL PICKUP

BACKGROUND OF THE INVENTION

1. Field of the Invention

The present invention relates to an optical pickup for reproduction, recording, or purge of optical disks or magnetic disks (hereinafter, referred to simply as "disk(s)") such as DVD/RW.

2. Description of the Related Art

Describing now a principle of an optical pickup, as shown in FIG. 7, information recorded in a disk D is read by projecting a laser light O1 from a laser diode LD attached via a holder 2 to the outer periphery of abase 1 through a diffraction grating G, a half mirror HM, a collimator lens QWP, and an objective lens OL and receiving the reflected light by a photodiode PD via the half mirror HM.

In the above-described structure, there may be a case in which the laser light O1 is displaced from an optical axis O2 of the collimator lens QWP due to variations in angle of diffusion of the laser light O1, and a technology for correcting the displacement is disclosed in JP-A-2-220228. According to this technology, as shown in FIG. 8 and FIG. 9, a laser hole 2a for fitting the laser diode LD therein is formed through the center of a rectangular holder 2, which is long in a direction X—X and short in a direction Y—Y. Then, insertion holes 2b for inserting adjusting screws are formed at four corners of the holder 2, the holder 2 is provided with a projection 2A projecting concentrically with the laser hole 2a on the back surface of the holder 2, four adjusting screws 3 are inserted into the respective insertion holes 2b, and coil springs 4 are fitted on the respective adjusting screws 3.

Describing now to a mounting procedure of the laser diode LD, the laser diode LD is fixed to the holder 2 with machine screws 5, and the projection 2A is fitted to an opening 1a of the base 1. Then, the respective adjusting screws 3 are screwed into the screw holes 1b of the base 1 in a state in which the respective coil springs 4 are interposed between the base 1 and the holder 2 to engage the laser diode LD with the outer periphery of the base 1 via the holder 2, and the laser light O1 is positioned on the optical axis O2 of the collimator lens QWP. Subsequently, by finely adjusting the screwing amount of the respective adjusting screws 3 against a resilient force of the respective coil springs 4, the posture of the holder 2 is slightly rotated in the directions indicated by arrows a and b about a contact point P between the opening 1a and the projection 2A for adjustment, and displacement of the center of the strength of the parallel ray due to variations in angle of diffusion of the laser light O1 is corrected, so that the laserlight O1 is aligned with the optical axis O2 of the collimator lens QWP.

In the structure in the related art, the projection 2A on the holder 2 is adapted to be fitted into the opening 1a. Therefore, when the laser light O1 is displaced from the optical axis O2 of the collimator lens QWP along the outer periphery of the base 1 vertically and laterally X—X, Y—Y, such displacement cannot be corrected. Consequently, there is no other way than discarding the holder 2, which results in increased cost. Since it is also adapted to perform fine adjustment of the screwing amount of the respective adjusting screws 3 to correct the posture of the holder 2 and hence there are many adjusting screws 3, fine adjustment of these screws is a troublesome work since it takes time and a lot of trouble. In addition, since a plurality of adjusting screws 3 and the coil springs 4 are required, which increases the number of parts, the manufacturing cost increases as well.

SUMMARY OF THE INVENTION

In view of such circumstances in the related art, it is an object of the present invention to provide an optical pickup in which the number of parts is small, and fine adjustment of the posture and the position of the holder can be performed quickly.

In order to achieve the object, a first aspect of the invention provides an optical pickup including: a base having a screw hole; a holder attached to the base; a laser diode held by the holder; a leaf spring; and an adjusting screw; wherein information stored in a disk is read by projecting a laser light from the laser diode to the disk via a collimator lens and an objective lens and receiving a reflected light by a photodiode; wherein the holder is formed of a substantially rectangular metal plate having short and long sides and is formed with a laser hole for fitting the laser diode through a center thereof; wherein an angular fulcrum is formed at the center of a back surface of the holder along a direction parallel to the short side and an inclined surface gradually inclining from the fulcrum toward the both ends of the back surface so that the back surface of the holder is formed into a substantially V-shape in side view; wherein recessed grooves are formed at both side edges on a front side of the holder at one end thereof so that a pair of stoppers are left on the back surface thereof at both side edges at the one end; wherein the both side edges on the back surface of the holder at the other end is removed to form a pair of communicating grooves which communicate with the respective recessed grooves; wherein a substantially U-shaped recess is formed from a center of the leaf spring toward one end thereof so that a pair of resilient arm portions are left at both side edges at the one end so as to sandwich the recess; wherein only the single adjusting screw is used; wherein insertion holes being larger in diameter than the adjusting screw are formed on the other ends of the holder and the leaf spring so as to oppose to the adjusting screw; wherein the holder is formed with a pair of engaging holes for positioning jigs on a front surface thereof; wherein the holder is temporarily secured on the base by placing the leaf spring so as to oppose to the back surface of the holder provided with the laser diode fitted into the laser hole, engaging the both resilient arm portions of the leaf spring with the respective stoppers of the holder, bringing the other end of the leaf spring and the fulcrum of the holder into abutment with the outer periphery of the base, and inserting the adjusting screw into the insertion holes on the holder and the leaf spring by screwing into the screw hole of the base; wherein the posture of the holder is corrected about the fulcrum by engaging the positioning jig with the both engaging holes of the holder to perform fine adjustment of the position of the holder vertically and laterally along the outer periphery of the base and perform fine adjustment of the screwing amount of the adjusting screw against the resilient force of the both resilient arm portions; and wherein ultraviolet curing adhesive agent is injected between the holder and the base and the adhesive agent is cured by irradiating an ultraviolet ray onto the adhesive agent to fix the holder to the base.

The above-described structure corresponds to an embodiment (See FIG. 1 to FIG. 6), and, according to this structure, the holder movably abuts against the outer periphery of the base via the fulcrum. Therefore, the laser light can be positioned on the optical axis of the collimator lens precisely by engaging the positioning jig with the pair of engaging holes formed on the front surface of the holder and moving the jig for fine adjustment of the position of the holder vertically and laterally along the outer periphery of the base.

Also, by performing fine adjustment of the screwing amount of the adjusting screw against the resilient force of the leaf spring, the posture of the holder can be corrected about the fulcrum, whereby displacement of the center of the strength of the parallel lay due to variations in angle of diffusion of the laser light is corrected to align the laser light with the optical axis of the collimator lens. In this case, since there is only one adjusting screw, fine adjustment thereof can be performed quickly.

In addition, only by placing the leaf spring so as to oppose to the back surface of the holder and engaging the both resilient arm portions of the leaf spring with the respective stoppers of the holder, the leaf spring can be assembled to the holder easily and the one end of the holder can be reliably urged toward the base by the both resilient arm portions.

In addition, the holder is adapted to be fixed to the base by the ultraviolet curing adhesive agent, and the fixing work can be performed quickly and reliably at a low cost in comparison with the case in which the holder is fixed by screws as in the related art.

In addition, since only one adjusting screw and one leaf spring are required, the number of parts is smaller than in the related art, and hence the manufacturing cost may be reduced as well.

A second aspect of the invention provides an optical pickup including: a base having a screw hole; a holder attached to the base; a laser diode held by the holder; a leaf spring; and an adjusting screw; wherein information stored in a disk is read by projecting a laser light from the laser diode, which is attached to an outer periphery of the base via the holder, to the disk via a collimator lens and an objective lens and receiving a reflected light by a photodiode; wherein the holder is formed of a substantially rectangular metal plate having short and long sides and is formed with a laser hole for fitting the laser diode through a center thereof; wherein an angular fulcrum is formed at the center of a back surface of the holder along a direction parallel to the short side; wherein the fulcrum is brought into abutment with the outer periphery of the base and one end of the holder is urged toward the base by the leaf spring; wherein the holder is temporarily secured to the base by screwing the adjusting screw through an insertion hole formed at the other end of the holder into the screw hole of the base; wherein the posture of the holder is corrected about the fulcrum by performing fine adjustment of the position of the holder vertically and laterally along the outer periphery of the base and performing fine adjustment of the screwing amount of the adjusting screw against the resilient force of the leaf spring; and wherein the holder is fixed to the base by injecting adhesive agent between the holder and the base.

According to the above-described structure, since the holder movably abuts against the outer periphery of the base via the fulcrum, the laser light can be positioned to the optical axis of the collimator lens precisely by performing fine adjustment of the position of the holder vertically and laterally along the outer periphery of the base.

Also, by performing fine adjustment of the screwing amount of the adjusting screw against the resilient force of the leaf spring, the posture of the holder is corrected about the fulcrum, whereby displacement of the center of the strength of the parallel ray due to variations in angle of diffusion of the laser light is corrected to align the laser light to the optical axis of the collimator lens. In this case, since only one adjusting screw is required, fine adjustment can be performed quickly and easily.

In addition, since only one adjusting screw and one leaf spring are required, the number of parts is smaller than in the related art, and hence the manufacturing cost may be reduced as well.

In addition to the second aspect, a third aspect of the invention is characterized in that recessed grooves are formed at both side edges on the front side of the holder at one end thereof so that the pair of stoppers are left on the back surface thereof at both side edges at the one end, in that the both side edges on the back surface of the holder at the other end is removed to form the pair of communicating grooves which communicate with the respective recessed grooves, in that the substantially U-shaped recess is formed from the center of the leaf spring toward one end thereof so that the pair of resilient arm portions are left at both side edges at the one end with the intermediary of the recess, and in that the leaf spring is arranged to oppose the back surface of the holder and the both resilient arm portions of the leaf spring is engaged with the respective stoppers of the holder.

In this arrangement, only by arranging the leaf spring so as to oppose the back surface of the holder and engaging the both resilient arm portions of the leaf spring with the respective stoppers of the holder, the leaf spring can be assembled to the holder easily and the one end of the holder can be reliably urged to the base by the both resilient arm portions.

In addition to the second or third aspect, a fourth aspect of the invention is characterized in that the adhesive agent is the ultraviolet curing adhesive agent, and in that the adhesive agent is injected between the holder and the base and is cured by irradiating an ultraviolet ray.

In this arrangement, the holder is fixed to the base by the ultraviolet curing adhesive agent, and hence the fixing work can be performed quickly and reliably at a low cost in comparison with the case in which the holder is fixed by a screw as in the related art.

In addition to any one of the second to fourth aspects, a fifth aspect of the invention is characterized in that the engaging hole for the positioning jig is formed on the front surface of the holder, and fine adjustment of the position of the holder is performed vertically and laterally along the outer periphery of the base by engaging the positioning jig with the engaging hole.

In this arrangement, by performing fine adjustment of the position of the holder vertically and laterally along the outer periphery of the base by engaging the positioning jig with the engaging hole formed on the front surface of holder and moving the jig, the laser light can be positioned on the optical axis of the collimator lens precisely.

DETAILED DESCRIPTION OF THE PREFFERED EMBODIMENTS

Figure 1:
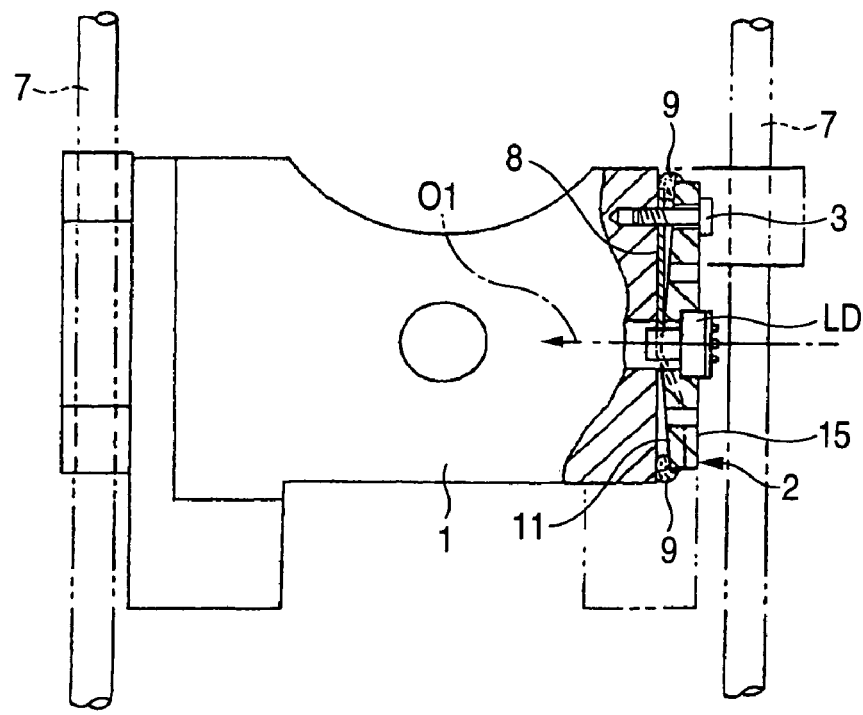
FIG. 1 is a partly broken plan view of an optical pickup according to an embodiment of the present invention.
Figure 2:
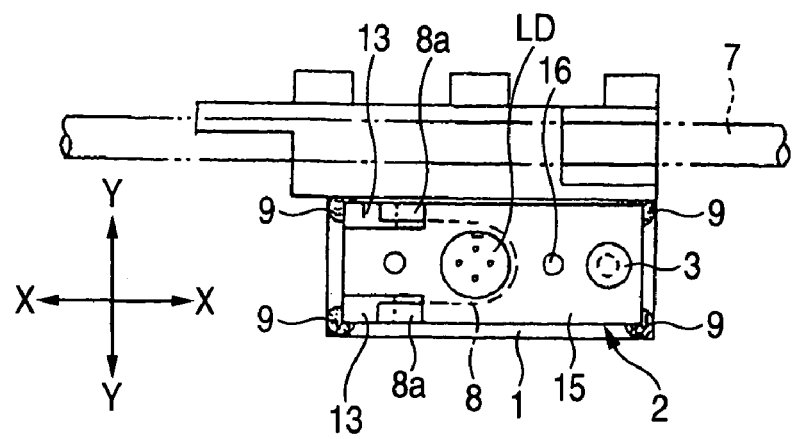
FIG. 2 is a front view of the embodiment.

FIG. 1 and FIG. 2 show an optical pickup. A holder 2 provided with a laser diode LD is brought into abutment with the outer periphery of a base 1, which can be moved along a guide rail 7 and is formed of a material which is superior in heat conduction (aluminum, for example), a leaf spring 8 for urging one end of the holder 2 toward the base 1 is provided and the other end of the holder is temporarily secured to the base 1 by an adjusting screw against the leaf spring 8, and the holder 2 is fixed to the base 1 by an ultraviolet curing adhesive agent 9.

Figure 3:
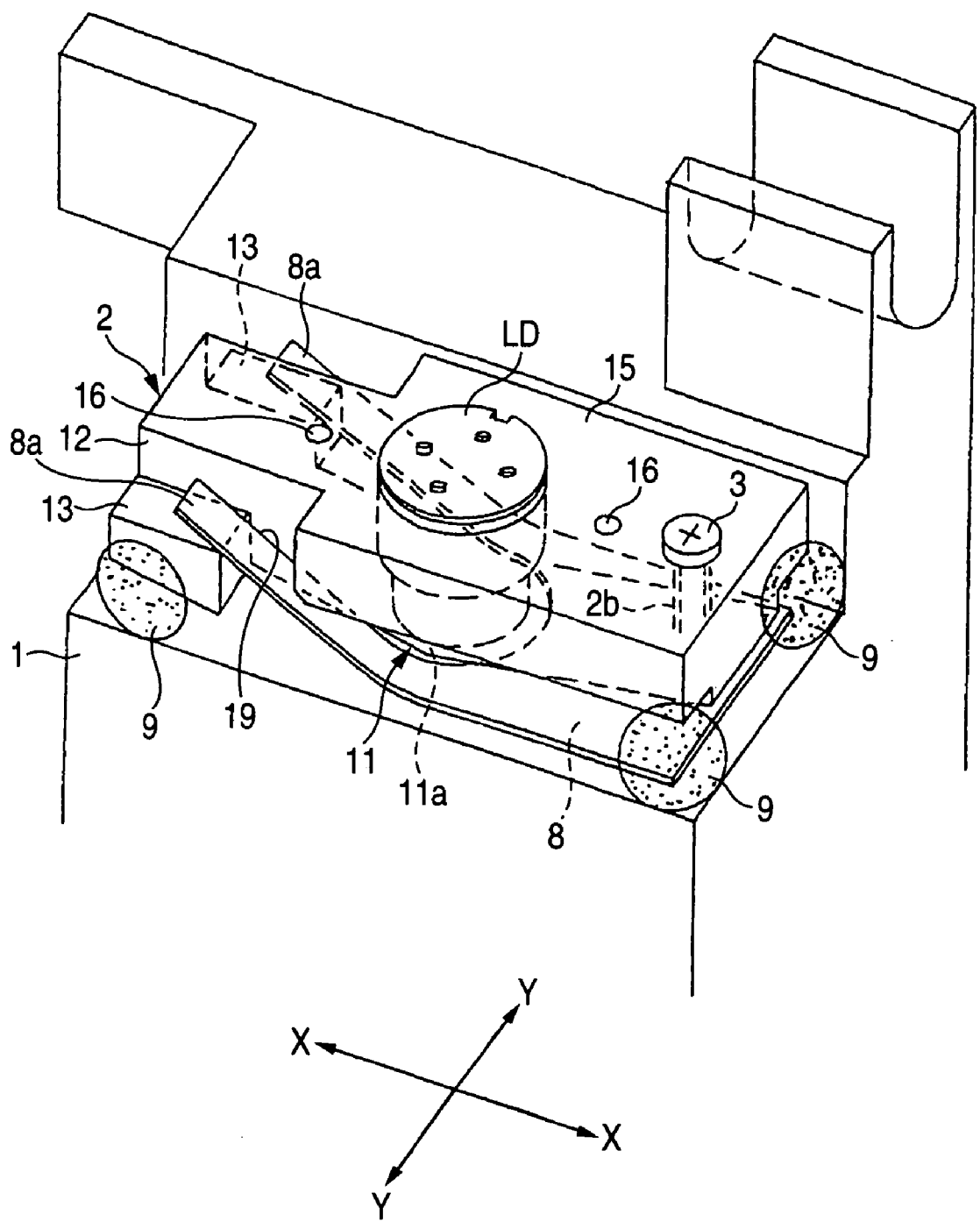
FIG. 3 is a perspective view of a principal portion of the embodiment.
Figure 4:
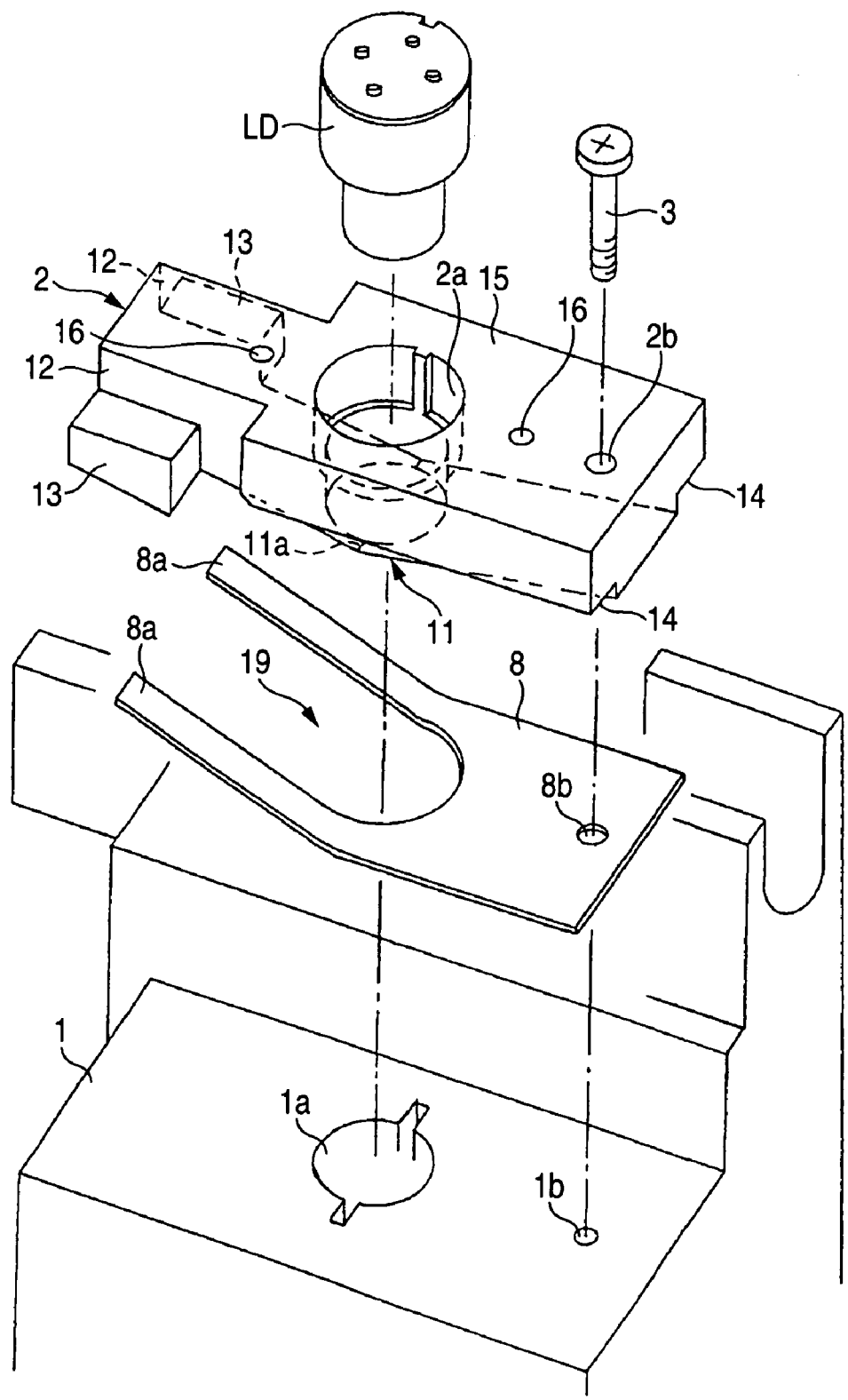
FIG. 4 is an exploded perspective view of the principal portion of the embodiment.
Figure 5:
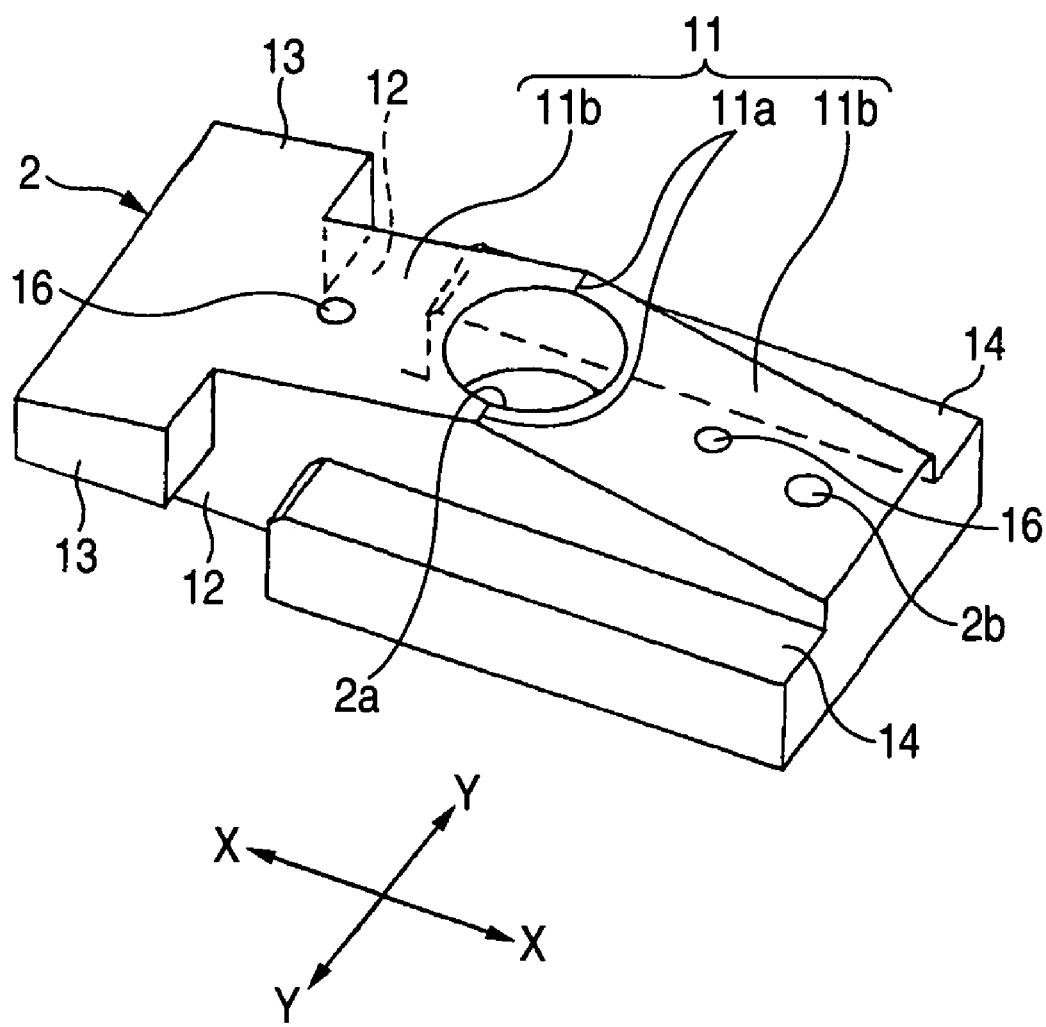
FIG. 5 is a perspective view of a back surface of a holder of the embodiment.

As shown in FIG. 3 to FIG. 5, the holder 2 is formed of a metallic material with high heat conductivity (zinc, for example) into a shape which is long in a direction X—X and short in a direction Y—Y. The holder 2 is formed with a laser hole 2a for fitting a laser diode LD through the center thereof. An angular fulcrum 11a is formed along the direction Y—Y at the center of the back surface of the holder 2 and an inclined surface 11b gradually inclining from the fulcrum 11a toward the both ends of the back surface, so that a back surface 11 of the holder 2 is formed into a substantially V-shape in side view (See FIG. 1). Recessed grooves 12 are formed at both side edges on the front side of the holder 2 at one end thereof so that a pair of stoppers 13 are left on the back surface thereof at both side edges at the one end. The both side edges on the back surface of the holder 2 at the other end is removed to form a pair of communicating grooves 14 which communicate with the respective recessed grooves 12. An insertion hole 2b is formed through the other end of the holder 2 so as to be larger than an adjusting screw 3 in diameter, engaging holes 16 are formed on a front surface 15 of the holder 2 on both sides of the laser hole 2a, so that a positioning jig 17 (See FIG. 6) is engaged with the both engaging holes 16.

As shown in FIG. 3 and FIG. 4, the leaf spring 8 is formed by a metal material of superior in heat conductivity (phosphor bronze, for example), and is formed with a pair of resilient arm portions 8a left at both side edges at one end to sandwitch a recess 19 by forming the substantially U-shaped recess 19 from the center to one end thereof so that the both resilient arm portions 8a are inserted from the communicating grooves 14 into the recessed grooves 12 to engage with the stoppers 13, respectively. An insertion hole 8b, having substantially the same diameter as the insertion hole 2b of the holder 2, is formed through the leaf spring 8 at the other end concentrically with the insertion hole 2b.

Figure 6A:
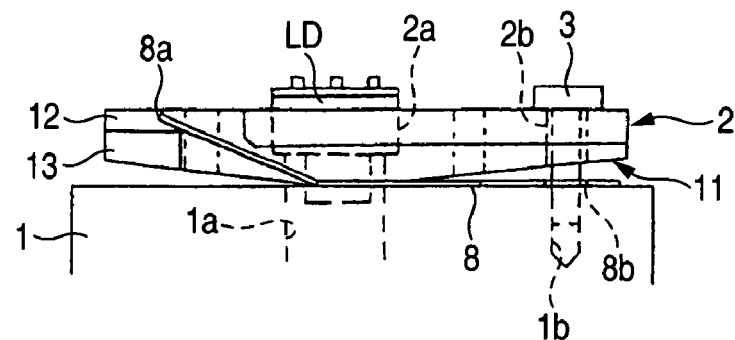
FIGS. 6A to 6C are explanatory drawings showing an assembling procedure of a laser diode.

A mounting procedure of the laser diode LD will be described. As shown in FIG. 6A, the holder 2 is temporarily secured to the base 1 by arranging the leaf spring 8 so as to oppose the back surface 11 of the holder 2 provided with the laser diode LD fitted into the laser hole 2a, engaging the both resilient arm portions 8a of the leaf spring 8 with the stoppers 13 of the holder 2 respectively, the other end of the leaf spring 8 and the fulcrum 11a of the holder 2 are brought into abutment with the outer periphery of the base 1, and inserting the adjusting screw 3 through the insertion holes 2b, 8b of the holder 2 and the leaf spring 8 and screwed into a screw hole 1b of the base 1. In this case, only by engaging the both resilient arm portions 8a with the stopper 13, the leaf spring 8 can be assembled to the holder 2 easily, and the one end of the holder 2 is reliably urged toward the base 1 by the both resilient arm portions 8a.

Figure 6B:
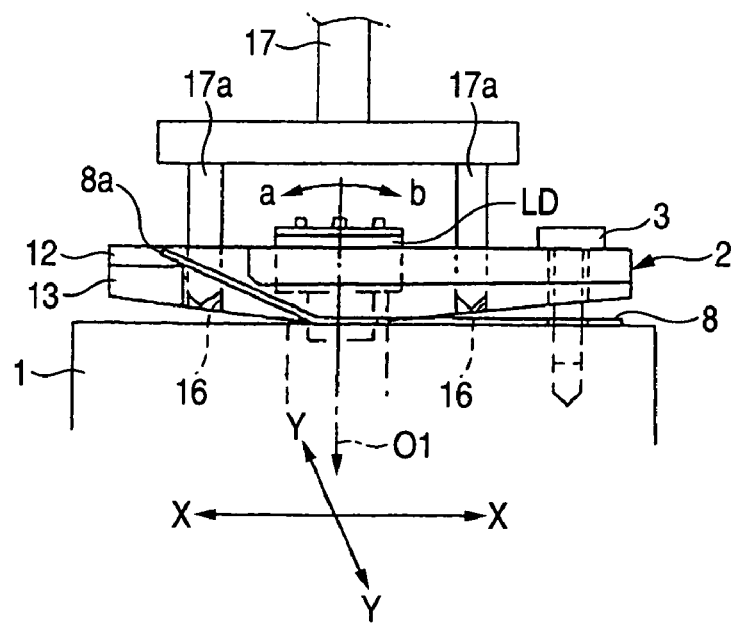
Figure 7:
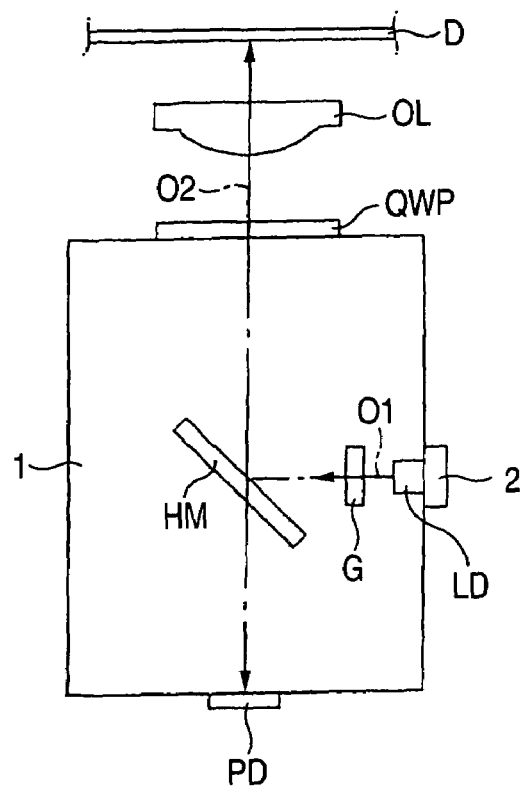
FIG. 7 is a schematic explanatory drawing showing a principle of an optical pickup.
Figure 8:
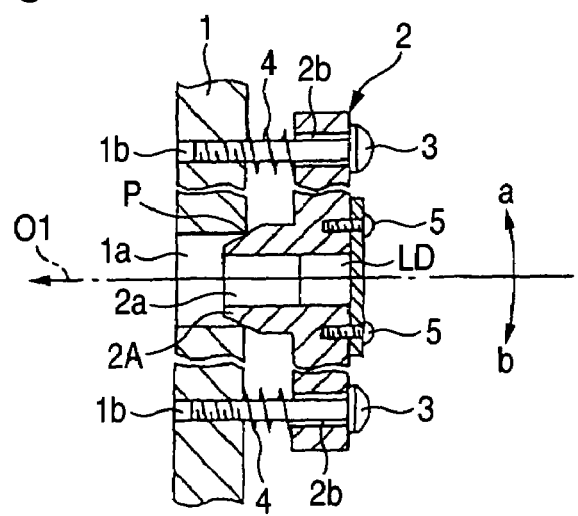
FIG. 8 is a horizontal cross-sectional view showing a related art.
Figure 9:
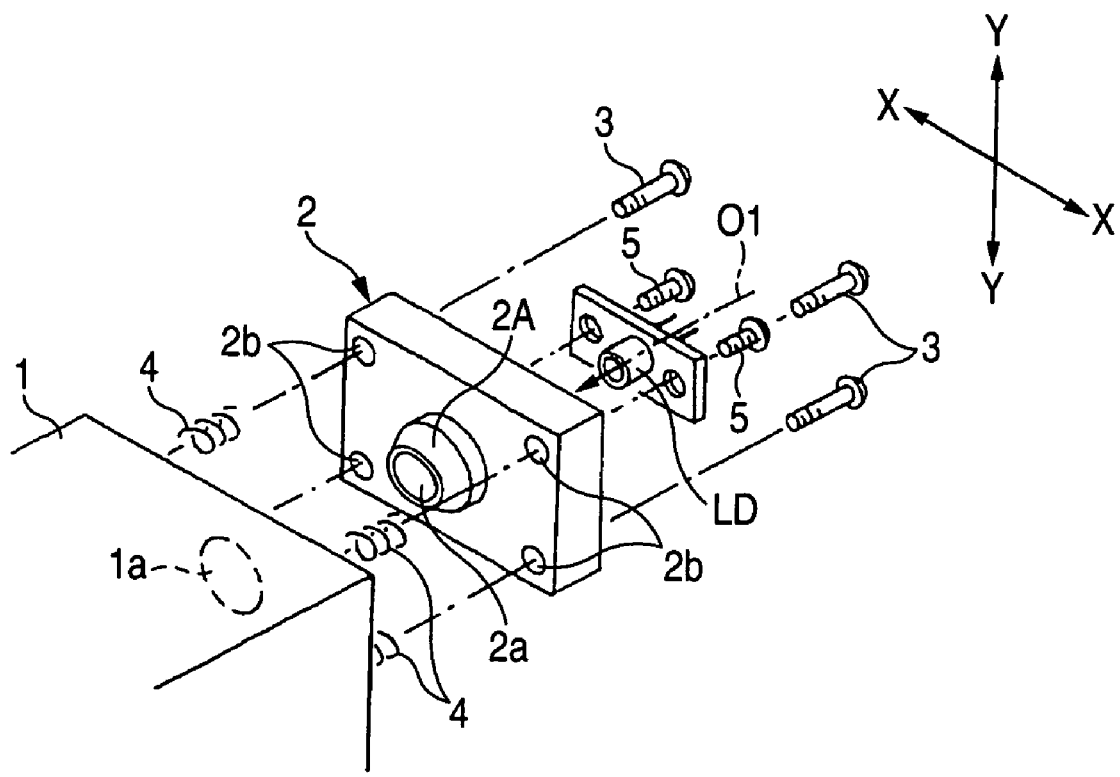
FIG. 9 is an exploded perspective view of the related art.

Subsequently, as shown in FIG. 6B, engaging pins 17a of the positioning jig 17 are engaged with the engaging holes 16 of the holder 2 respectively, and then the jig 17 is moved to perform fine adjustment of the position of the holder 2 vertically and laterally X—X, Y—Y along the outer periphery of the base 1. Accordingly, a laser light O1 is aligned with an optical axis O2 of a collimator lens QWP (See FIG. 7), and then fine adjustment of the screwing amount of an adjusting screw 3 against the resilient force of the both resilient arm portions 8a to correct the posture of the holder 2 in the direction indicated by arrows a, b, about a fulcrum 11a, so that displacement of the center of the strength of the parallel ray due to variations in angle of diffusion of the laser light O1 is corrected, and the laser light O1 is aligned with the optical axis O2 of the collimator lens QWP. In this case, since only one adjusting screw 3 is required, fine adjustment thereof can be performed quickly and easily, and only one leaf spring 8 is required, the number of parts may be reduced and hence the manufacturing cost may be reduced in comparison with the related art.

Figure 6C:
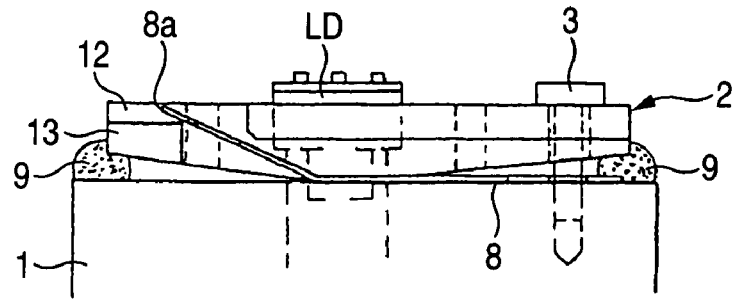

Subsequently, as shown in FIG. 6C, the ultraviolet curing adhesive agent 9 is injected between the base 1 and the holder 2 and the adhesive agent 9 is cured by irradiating the ultraviolet ray so that the holder 2 is fixed to the base 1. In this case, in comparison with the case in which the holder 2 is fixed by screws as in the related art, the fixing work can be performed quickly and reliably at a low cost.

In this arrangement, by forming the base 1 of aluminum, and the holder 2 of zinc, and the leaf spring 8 of phosphor bronze, respectively, heat radiation of the laser diode LD is promoted so that the laser diode LD can be operated efficiently.

According to the first aspect of the invention, as shown in the embodiment (See FIG. 1 to FIG. 6), the holder movably abuts against the outer periphery of the base via the fulcrum. Therefore, the laser light can be positioned on the optical axis of the collimator lens precisely by engaging the positioning jig with the pair of engaging holes formed on the front surface of the holder and moving the jig for fine adjustment of the position of the holder vertically and laterally along the outer periphery of the base.

Also, by performing fine adjustment of the screwing amount of the adjusting screw against the resilient force of the leaf spring, the posture of the holder can be corrected about the fulcrum, whereby displacement of the center of the strength of the parallel lay due to variations in angle of diffusion of the laser light is corrected to align the laser light with the optical axis of the collimator lens. In this case, since there is only one adjusting screw, fine adjustment thereof can be performed quickly and easily.

In addition, only by placing the leaf spring so as to oppose to the back surface of the holder and engaging the both resilient arm portions of the leaf spring with the respective stoppers of the holder, the leaf spring can be assembled to the holder easily and the one end of the holder can be reliably urged toward the base by the both resilient arm portions.

In addition, the holder is adapted to be fixed to the base by the ultraviolet curing adhesive agent, and the fixing work can be performed quickly and reliably at a low cost in comparison with the case in which the holder is fixed by screws as in the related art.

In addition, since only one adjusting screw and one leaf spring are required, the number of parts is smaller than in the related art, and hence the manufacturing cost may be reduced as well.

According to the second aspect of the invention, since the holder movably abuts against the outer periphery of the base via the fulcrum, the laser light can be positioned to the optical axis of the collimator lens precisely by performing fine adjustment of the position of the holder vertically and laterally along the outer periphery of the base.

Also, by performing fine adjustment of the screwing amount of the adjusting screw against the resilient force of the leaf spring, the posture of the holder is corrected about the fulcrum, whereby displacement of the center of the strength of the parallel ray due to variations in angle of diffusion of the laser light is corrected to align the laser light to the optical axis of the collimator lens. In this case, since only one adjusting screw is required, fine adjustment can be performed quickly and easily.

In addition, since only one adjusting screw and one leaf spring are required, the number of parts is smaller than in the related art, and hence the manufacturing cost may be reduced as well.

According to the third aspect of the invention, only by arranging the leaf spring so as to oppose the back surface of the holder and engaging the both resilient arm portions of the leaf spring with the respective stoppers of the holder, the leaf spring can be assembled to the holder easily and the one end of the holder can be reliably urged to the base by the both resilient arm portions.

According to the fourth aspect of the invention, the holder is fixed to the base by the ultraviolet curing adhesive agent, and hence the fixing work can be performed quickly and reliably at a low cost in comparison with the case in which the holder is fixed by a screw as in the related art.

According to the fifth aspect of the invention, by performing fine adjustment of the position of the holder vertically and laterally along the outer periphery of the base by engaging the positioning jig with the engaging hole formed on the front surface of the holder and moving the jig, the laser light can be positioned on the optical axis of the collimator lens precisely.

What is claimed is:

1. An optical pickup comprising:
   a base having a screw hole;
   a holder attached to the base;
   a laser diode held by the holder;
   a leaf spring; and
   an adjusting screw;
   wherein information stored in a disk is read by projecting a laser light from the laser diode to the disk via a collimator lens and an objective lens and receiving a reflected light by a photodiode;
   wherein the holder is formed of a substantially rectangular metal plate having short and long sides and is formed with a laser hole for fitting the laser diode through a center thereof;
   wherein an angular fulcrum is formed at the center of a back surface of the holder along a direction parallel to the short side and an inclined surface gradually inclining from the fulcrum toward the both ends of the back surface so that the back surface of the holder is formed into a substantially V-shape in side view;
   wherein recessed grooves are formed at both side edges on a front side of the holder at one end thereof so that a pair of stoppers are left on the back surface thereof at both side edges at the one end;
   wherein the both side edges on the back surface of the holder at the other end is removed to form a pair of communicating grooves which communicate with the respective recessed grooves;
   wherein a substantially U-shaped recess is formed from a center of the leaf spring toward one end thereof so that a pair of resilient arm portions are left at both side edges at the one end so as to sandwich the recess;
   wherein only the single adjusting screw is used;
   wherein insertion holes being larger in diameter than the adjusting screw are formed on the other ends of the holder and the leaf spring so as to oppose to the adjusting screw;
   wherein the holder is formed with a pair of engaging holes for positioning jigs on a front surface thereof;
   wherein the holder is temporarily secured on the base by placing the leaf spring so as to oppose to the back surface of the holder provided with the laser diode fitted into the laser hole, engaging the both resilient arm portions of the leaf spring with the respective stoppers of the holder, bringing the other end of the leaf spring and the fulcrum of the holder into abutment with the outer periphery of the base, and inserting the adjusting screw into the insertion holes on the holder and the leaf spring by screwing into the screw hole of the base;
   wherein the posture of the holder is corrected about the fulcrum by engaging the positioning jig with the both engaging holes of the holder to perform fine adjustment of the position of the holder vertically and laterally along the outer periphery of the base and perform fine adjustment of the screwing amount of the adjusting screw against the resilient force of the both resilient arm portions; and
   wherein ultraviolet curing adhesive agent is injected between the holder and the base and the adhesive agent is cured by irradiating an ultraviolet ray onto the adhesive agent to fix the holder to the base.

2. An optical pickup comprising:
   a base having a screw hole;
   a holder attached to the base;
   a laser diode held by the holder;
   a leaf spring; and
   an adjusting screw;
   wherein information stored in a disk is read by projecting a laser light from the laser diode, which is attached to an outer periphery of the base via the holder, to the disk via a collimator lens and an objective lens and receiving a reflected light by a photodiode;
   wherein the holder is formed of a substantially rectangular metal plate having short and long sides and is formed with a laser hole for fitting the laser diode through a center thereof;
   wherein an angular fulcrum is formed at the center of a back surface of the holder along a direction parallel to the short side;
   wherein the fulcrum is brought into abutment with the outer periphery of the base and one end of the holder is urged toward the base by the leaf spring;
   wherein the holder is temporarily secured to the base by screwing the adjusting screw through an insertion hole formed at the other end of the holder into the screw hole of the base;
   wherein the posture of the holder is corrected about the fulcrum by performing fine adjustment of the position of the holder vertically and laterally along the outer periphery of the base and performing fine adjustment of the screwing amount of the adjusting screw against the resilient force of the leaf spring; and wherein the holder is fixed to the base by injecting adhesive agent between the holder and the base.

3. The optical pickup according to claim 2, wherein recessed grooves are formed at both side edges on a front side of the holder at one end thereof so that a pair of stoppers are left on a back surface thereof at both side edges at the one end;

wherein the both side edges on the back surface of the holder at the other end is removed to form a pair of communicating grooves which communicate with the respective recessed grooves;

wherein the substantially U-shaped recess is formed from a center of the leaf spring toward one end thereof so that a pair of resilient arm portions are left at both side edges at the one end so as to sandwich the recess; and wherein the leaf spring is arranged to oppose the back surface of the holder and the both resilient arm portions of the leaf spring is engaged with the respective stoppers of the holder.

4. The optical pickup according to claim 2, wherein the adhesive agent is an ultraviolet curing adhesive agent, and the adhesive agent is injected between the holder and the base and is cured by irradiating an ultraviolet ray.

5. The optical pickup according to claim 2, wherein an engaging hole for a positioning jig is formed on a front surface of the holder, and fine adjustment of the position of the holder is performed vertically and laterally along the outer periphery of the base by engaging the positioning jig with the engaging hole.

6. An optical pickup comprising:

a base having a screw hole;
a holder attached to the base;
a laser diode held by the holder;
a leaf spring; and
an adjusting screw;

wherein the holder is formed of a substantially rectangular metal plate having short and long sides and is formed with a laser hole for fitting the laser diode through a center thereof;

wherein an angular fulcrum is formed at the center of a back surface of the holder along a direction parallel to the short side;

wherein the fulcrum is brought into abutment with the base via the leaf spring and one end of the holder is urged toward the base by the leaf spring;

wherein the holder is temporarily secured to the base by screwing the adjusting screw through an insertion hole formed at the other end of the holder into the screw hole of the base; and wherein the posture of the holder is corrected about the fulcrum by performing fine adjustment of the position of the holder vertically and laterally along the base and performing fine adjustment of the screwing amount of the adjusting screw against the resilient force of the leaf spring.

7. The optical pickup according to claim 6, wherein the holder is fixed to the base by injecting adhesive agent between the holder and the base.

* * * * *